United States Patent [19]
Mori

[11] Patent Number: 5,647,659
[45] Date of Patent: Jul. 15, 1997

[54] VEHICULAR HEADLAMP HAVING IMPROVED ORTHOGONAL CONVERSION GEAR MECHANISM

[75] Inventor: Hideshi Mori, Shizuoka, Japan

[73] Assignee: Koito Manufacturing Co., Ltd., Tokyo, Japan

[21] Appl. No.: 427,101

[22] Filed: Apr. 21, 1995

[30] Foreign Application Priority Data

Apr. 27, 1994 [JP] Japan .................. 6-089827

[51] Int. Cl.⁶ .................. B60Q 1/02
[52] U.S. Cl. .............. 362/66; 362/61; 362/284; 362/324; 362/273; 362/289; 362/424
[58] Field of Search .............. 362/61, 66, 284, 362/324, 424, 80, 421, 273, 289, 418, 422, 423, 428; 74/89.13

[56] References Cited

U.S. PATENT DOCUMENTS

| | | | |
|---|---|---|---|
| 4,845,598 | 7/1989 | Watanabe et al. | 362/61 |
| 4,881,152 | 11/1989 | Watanabe et al. | 362/61 |
| 4,916,587 | 4/1990 | Hirose | 362/66 |
| 4,930,367 | 6/1990 | Nagasawa | 74/416 |
| 4,959,758 | 9/1990 | Filosa et al. | 362/66 |
| 5,172,972 | 12/1992 | Terao | 362/66 |
| 5,355,287 | 10/1994 | Denley | 362/66 |
| 5,381,327 | 1/1995 | Schmitt et al. | 362/66 |

*Primary Examiner*—Ira S. Lazarus
*Assistant Examiner*—Thomas M. Sember
*Attorney, Agent, or Firm*—Sughrue, Mion, Zinn, Macpeak & Seas

[57] ABSTRACT

A vehicular headlamp including a lamp body, a reflector accommodated in the lamp body and tiltably supported with respect to the lamp body by an aiming mechanism, and an aiming screw which constitutes a part of the aiming mechanism and extends in a front-rear direction of the lamp body. The rear end part of the aiming screw penetrates the rear wall of the lamp body and protrudes rearward from the lamp body. An orthogonal conversion gear mechanism engaging a rear end part of the aiming screw and has a rotational operating shaft linked with the aiming screw for causing the same to rotate. The rotational operating shaft is provided on an upper end thereof with a concave engaging part engageable with the tip of a driver tool. An expanding member protruding from the rear wall of the lamp body covers the orthogonal conversion gear mechanism like a visor. The expanding member also serves as a driver guide for guiding the tip end of the driver to a concave engaging part of the rotational operating shaft.

14 Claims, 6 Drawing Sheets

VEHICULAR HEADLAMP HAVING IMPROVED ORTHOGONAL CONVERSION GEAR MECHANISM

BACKGROUND OF THE INVENTION

The present invention relates generally to a vehicular headlamp for use on, for example, an automobile, and more particularly to a vehicular headlamp in which a reflector is tiltably supported in a lamp body by means of an aiming mechanism, and an orthogonal conversion gear mechanism having an rotational operating shaft for rotation of an aiming screw is disposed on the rear wall of the lamp body.

A conventional headlamp of this type, as shown in FIG. 7, is provided with a lamp body 1 and a reflector 2 accommodated in the lamp body 1, which reflector is supported by an aiming screw 3 constituting a part of an aiming mechanism, as disclosed in Unexamined Japanese Patent Application No. Hei. 5-258602. The aiming screw 3 is rotatably supported on the rear wall of the lamp body 1. A rotational operating shaft 4 extends upward along the rear wall of the lamp body 1. An orthogonal conversion gear mechanism 5 constituted by gears 5a, 5b, 5c and 5d is provided between the rotational operating shaft 4 and a rear end part of the aiming screw 3 projecting rearward from the rear wall of the lamp body 1, so that the aiming screw 3, linked with the rotational operating shaft 4, is rotated when the shaft 4 rotates. A nut 2a fitted on the rear side of the reflector 2 threadably engages a front end part of the aiming screw 3. With this structure, when the aiming screw 3 is rotated, the nut 2a moves back and forth on the aiming screw 3 so that the reflector 2 is tilted.

In the conventional headlamp as described above, since the orthogonal conversion gear mechanism 5 protrudes rearward a significant distance, the mechanism 5 can rather easily be struck against the vehicle body when the headlamp is assembled to the vehicle so that the orthogonal conversion gear mechanism may be damaged.

SUMMARY OF THE INVENTION

The present invention was made in view of the foregoing problems accompanying the conventional headlamp having an orthogonal conversion gear mechanism. Accordingly, an object of the invention is to provide a vehicular headlamp with which an orthogonal conversion gear mechanism disposed on a rear wall of a lamp body is not damaged when the headlamp is assembled to the vehicle.

Another object of the invention is to provide a vehicular headlamp capable of providing easy rotational operation of a rotational operating shaft for rotating an aiming screw extending along a rear surface of the lamp body.

The above and other objects can be realized by the provision of a vehicular headlamp which, according to the present invention, includes a lamp body, a headlamp accommodated in the lamp body and tiltably supported with respect to the lamp body by means of an aiming mechanism, an aiming screw which constitutes a part of the aiming mechanism and extends in a front-rear direction of the lamp body, a rear end part of the aiming screw penetrating the rear wall of the lamp body and protruding rearward from the lamp body, and an orthogonal conversion gear mechanism engaging with a rear end part of the aiming screw and having a rotational operating shaft linked with the aiming screw for operating the same to rotate, the rotational operating shaft being provided at an upper end face thereof with a concave engaging part engageable with the end of a driver tool. When the rotational operating shaft is rotated by the driver, the aiming screw rotates so that the headlamp body is tilted, thereby to adjust the illumination angle of the headlamp. With this structure, the present invention is characterized by the provision of an expanding member protruding from the rear wall of the lamp body and covering the orthogonal conversion gear mechanism like a visor. The expanding member also serves as a driver guide for guiding the end of the driver to a concave engaging part of the rotational operating shaft.

The rotational operating shaft may be inclined rearward, and a driver guide face of the expanding member provided at an upper portion of the rotational operating shaft and inclined to align with the inclined rotational operating shaft. A driver side part guide member may be formed on the expanding member for surrounding a side part of the driver which operates the rotational operating shaft to rotate.

According to the vehicular headlamp thus structured, the expanding member effectively reduces the possibility of striking the orthogonal conversion gear mechanism which protrudes rearward from the rear wall of the lamp body due to the presence of the expanding member projecting from the rear wall of the lamp body and covering the orthogonal conversion gear mechanism. Further, the driver guide face and the driver side part guide member of the expanding member guide the tip end of the driver toward the concave engaging part of the rotational operating shaft.

According to another aspect of the present invention, since both the rotational operating shaft and the driver guide face of the expanding member which are aligned to each other are inclined rearward, a rear end part of the driver guide face is located rearward of a position of the concave engaging part of the rotational operating shaft disposed on the upper end face thereof. Accordingly, the possibility of striking the orthogonal conversion gear mechanism can be further lowered.

According to still another aspect of the present invention, since the driver side part guide member guides the driver used for rotating the rotational operating shaft, accurate, smooth and speedy rotation of the shaft by the driver can be assured.

DESCRIPTION OF THE PREFERRED EMBODIMENTS

Preferred embodiments of the present invention will now be described with reference to accompanying drawings.

Figure 1:
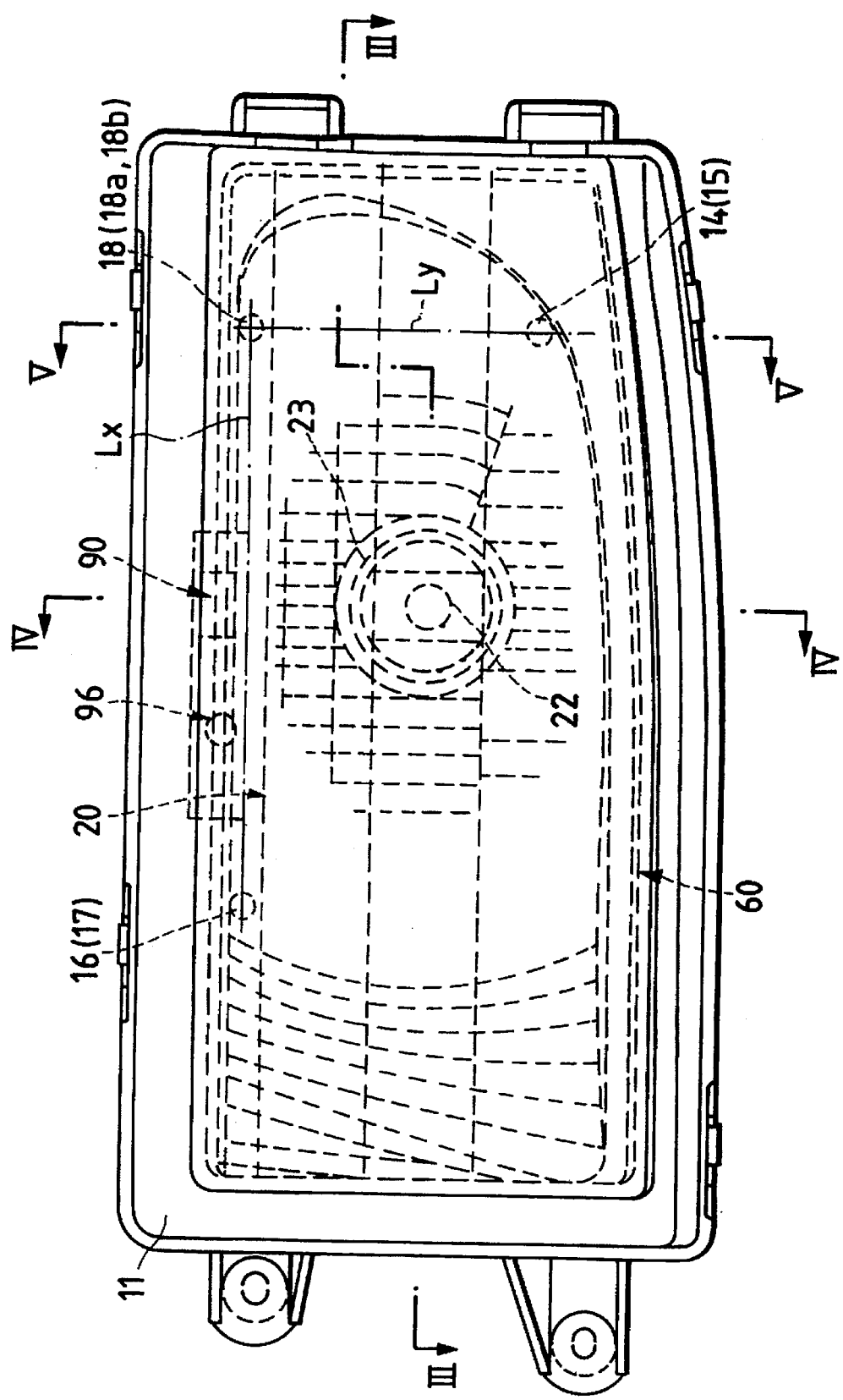
FIG. 1 is a front plan view of a vehicular headlamp constructed according to a first embodiment of the present invention.
Figure 2:
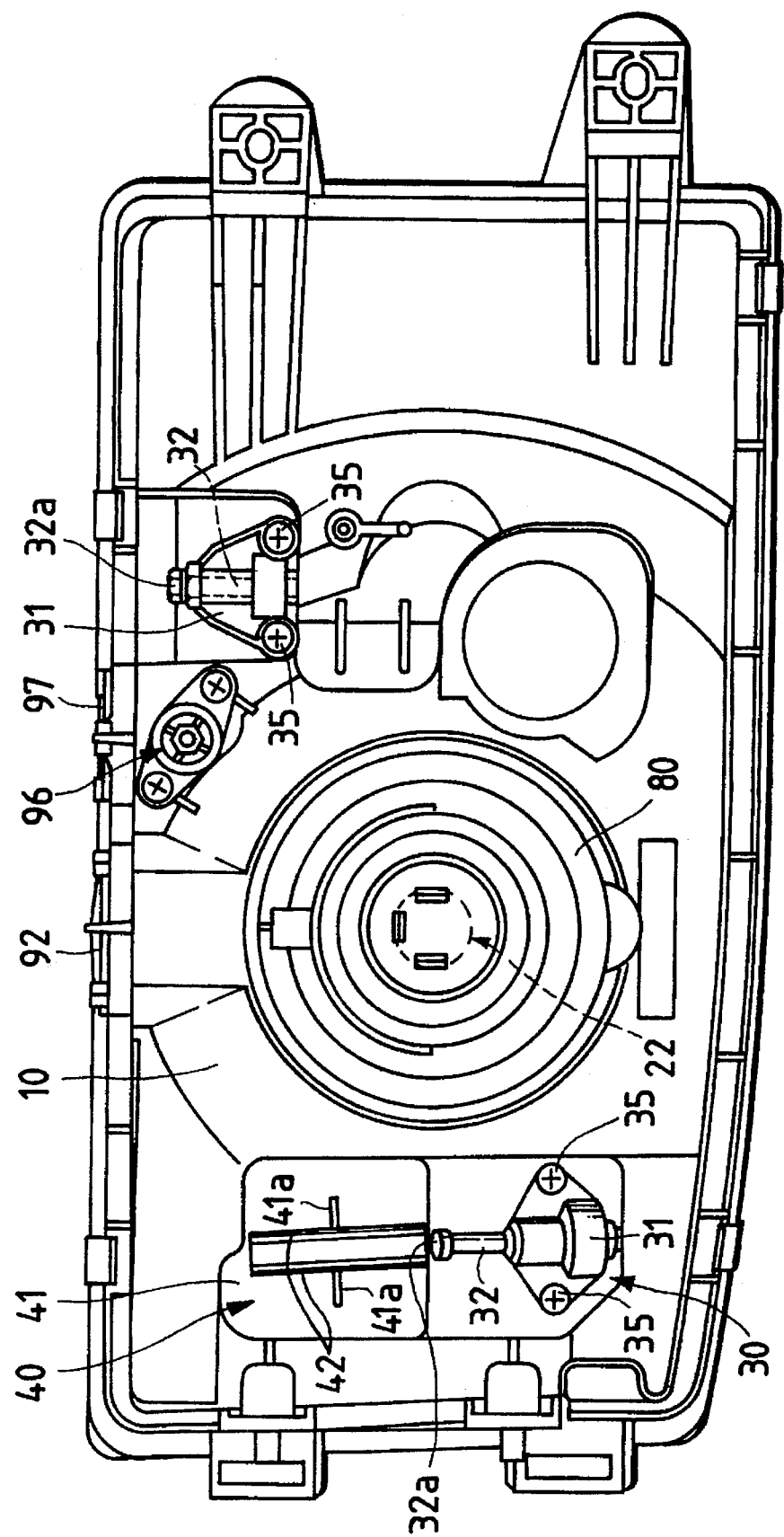
FIG. 2 is a rear plan view of the headlamp shown in FIG. 1.
Figure 3:
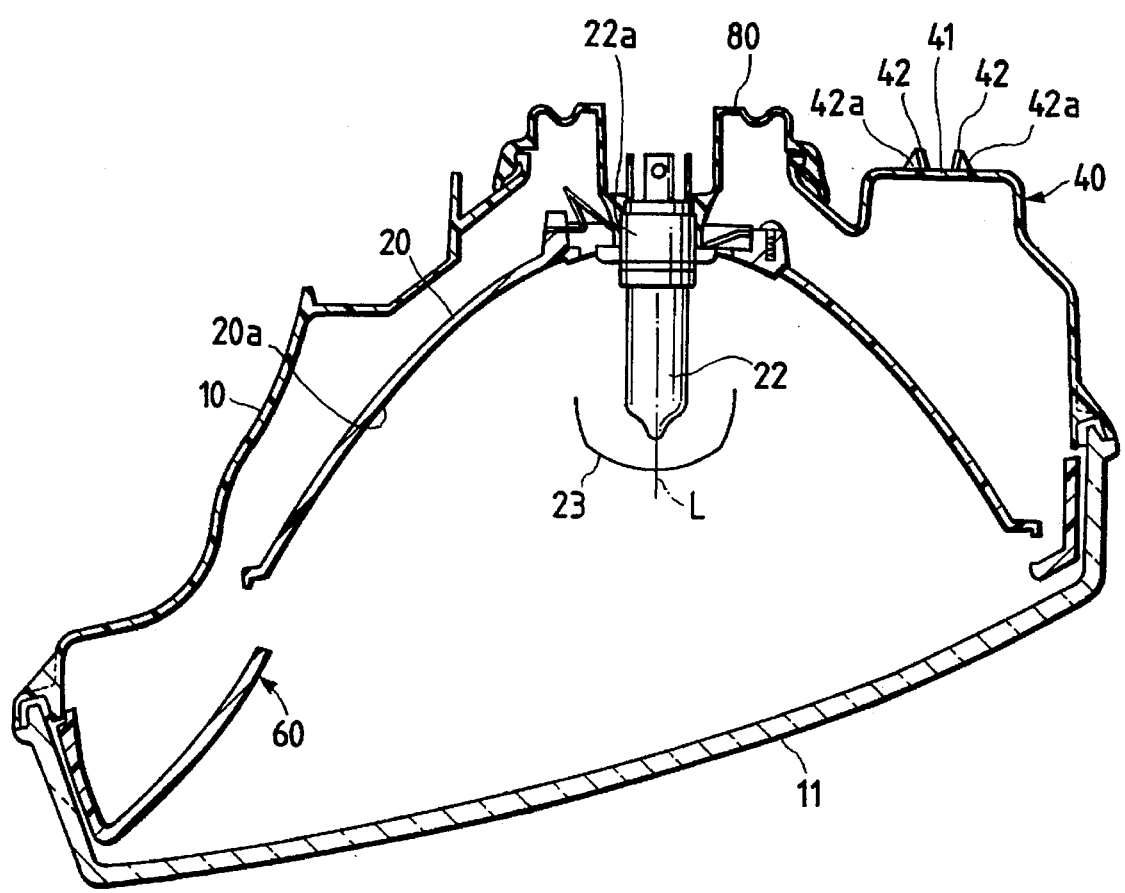
FIG. 3 is a horizontal cross-sectional view showing the headlamp taken along line III—III in FIG. 1.
Figure 4:
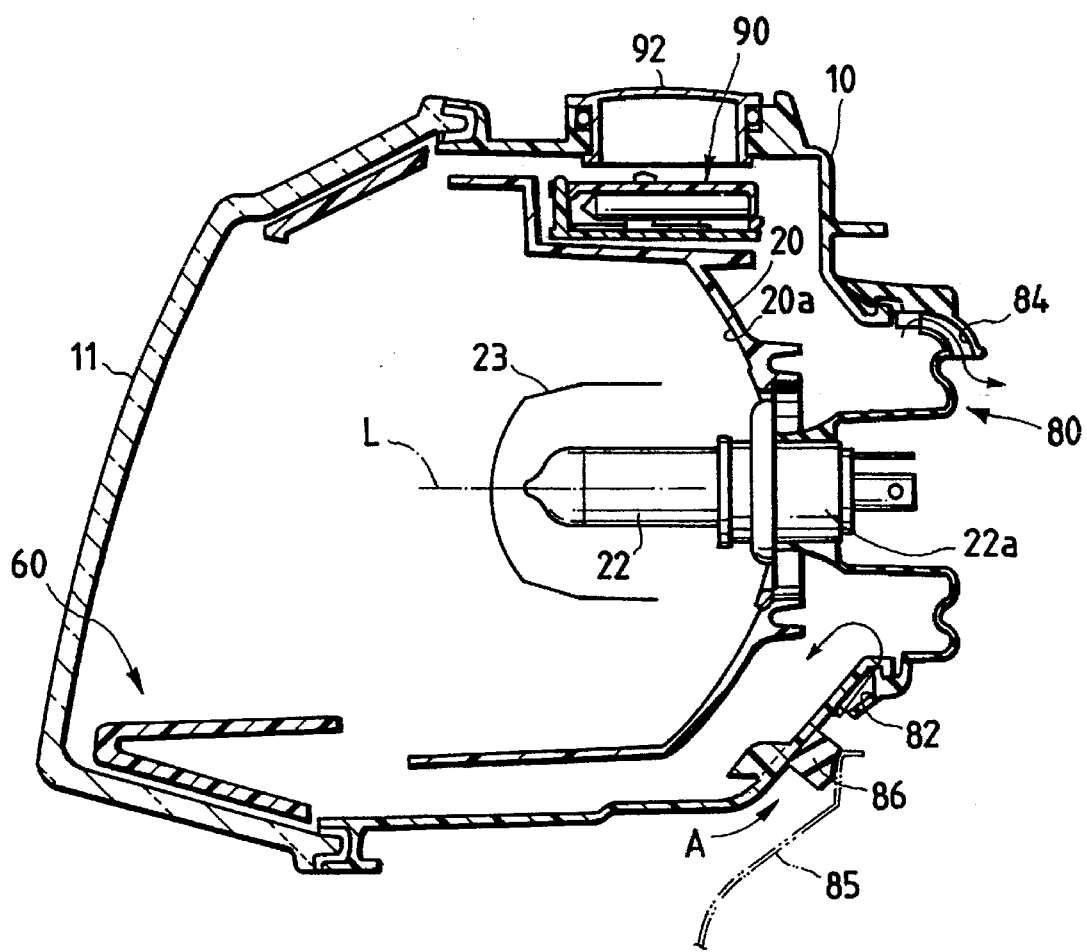
FIG. 4 is a vertical sectional view showing the headlamp taken along line IV—IV in FIG. 1.
Figure 5:
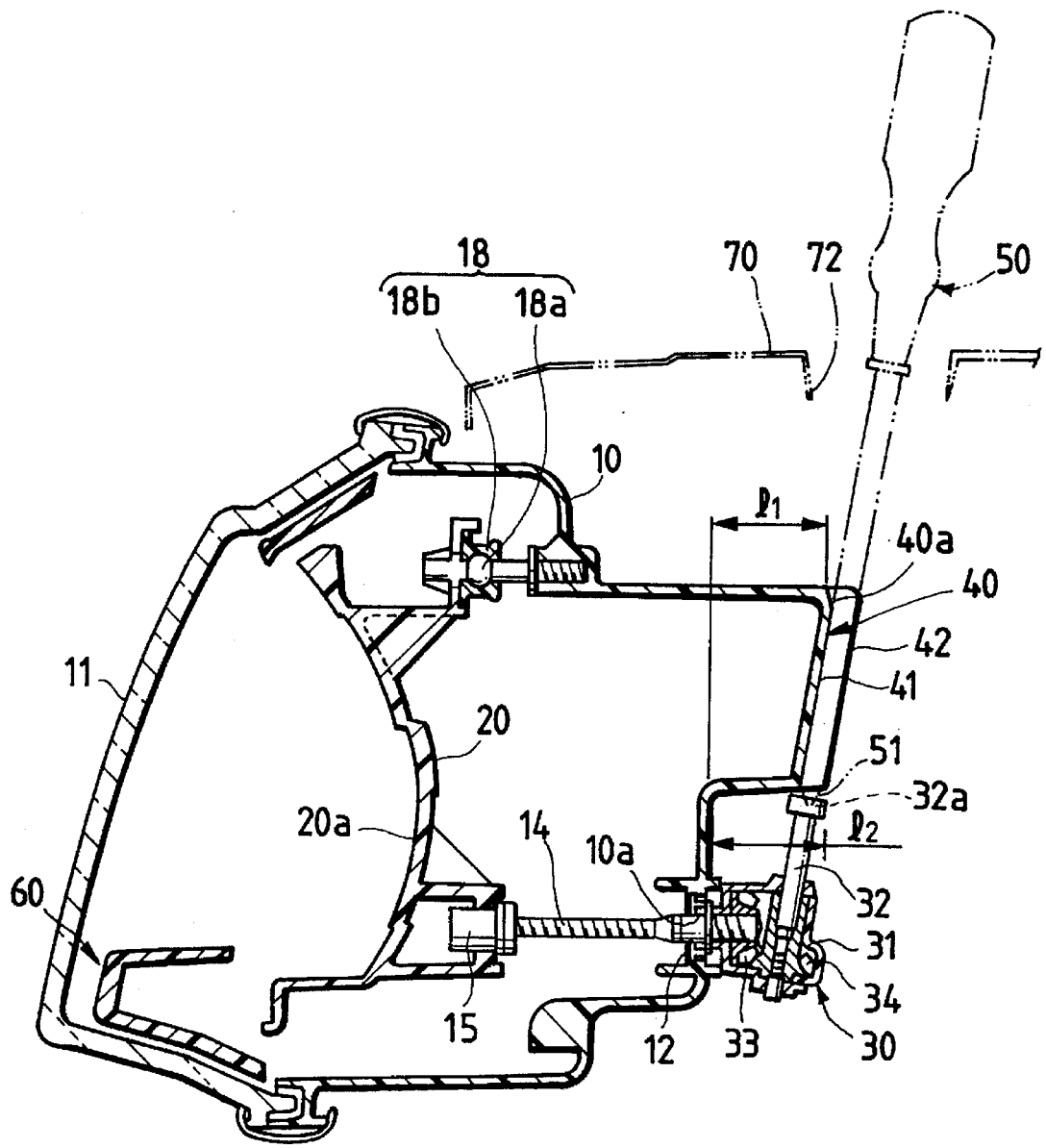
FIG. 5 is a vertical sectional view showing the headlamp taken along line V—V in FIG. 1.

FIGS. 1 through 5 show a first embodiment of the invention. Specifically, FIG. 1 is a front plan view of a vehicular headlamp constructed according to a first embodiment of the present invention, FIG. 2 is a rear plan view of the headlamp shown in FIG. 1, FIG. 3 is a horizontal cross-sectional view showing the headlamp taken along line III—III in FIG. 1, FIG. 4 is a vertical sectional view showing the headlamp taken along line IV—IV in FIG. 1, and FIG. 5 is a vertical sectional view showing the headlamp taken along line V—V in FIG. 1.

The vehicular headlamp of the invention includes a cup-shaped lamp body 10 accommodating therein a reflector 20 on which is mounted a bulb 2. The reflector is tiltably supported by an aiming mechanism constituted by a pair of aiming screws 14, 16 and a single ball joint 18. Both of the screws 14 and 16 penetrate the rear wall of the lamp body 10 and are rotatably supported thereon. A front end part of each the screws 14 and 16 threadably engages nuts 15 and 17, respectively, which are fit in a rear part of the reflector 20. A push-on fixer 12 holds the screws 14 and 16 in a screw through-hole formed in the wall of the lamp body 10 so as to prevent the removal of the screws. The ball joint 18 is formed by a ball member 18a protruding frontward from the rear wall of the lamp body 10 and a ball receiving member 18b mounted in the rear portion of the reflector 20 for supporting the ball member 18a. When the screws 14 and 16 rotate the nuts 15 and 17 moves back and forth on the screws 14 and 16, respectively, so that the reflector 20 is operated to tilt along a horizontal axis $L_x$ or a vertical axis $L_y$.

The vehicular headlamp of the embodiment is also provided with a transparent front cover 11 mounted over a front opening of the lamp body 10 and a shade 23 secured by leg members (not shown) to the reflector 20 and surrounding a front end part of the bulb 22. The shade 23 cuts off part of the light emitted from the bulb 22 in the direction of the reflecting surface of the reflector 20, thereby to form a dimmed light beam (low beam).

A multiple reflection surface 20a is formed on a front surface of the reflector 20 for reflecting light emitted from the bulb 22 in a desired direction. The reflected light from the multiple reflection surface 20a is transmitted through the front cover 11 and diffused in the desired direction to provide the dimmed light beam having the desired light distribution pattern. Vertically continuous rectangular patterns shown in FIG. 1, which are visible through the front cover 11, are step elements which constitute the multiple reflection surface 20a.

As best shown in FIG. 5, a gear unit 30, serving as an orthogonal conversion gear mechanism, is disposed at a rear portion of the lamp body 10 where the rear end part of the aiming screw 14 (16) protrudes. The gear unit 30 is provided with a gear case 31, a rotational operating shaft 32 rotatably supported by the gear case 31 and extending upward, and a pair of bevel gears 33 and 34 engaged between the aiming screw 14 (16) and the rotational operating shaft 32. On the rear end part of the aiming screw 14 protruding rearward from the lamp body is mounted a bevel gear 33 which engages a bevel gear 34 mounted on the lower part of the rotational operating shaft 32. The gear case 31 houses therein the pair of bevel gears 33 and 34, the rear end part of the aiming screw 14 (16) and a region where a lower end part of the rotational operating shaft 32 is disposed. The gear case 31 is secured to the rear wall of the lamp body 10 by screws 35.

The gear unit 30 is previously assembled with the aiming screw 14 (16), and the aiming screw 14 (16) of the assembly is inserted in a screw through-hole 10a formed in the rear wall of the lamp body 10 from the back thereof. Then, as shown in FIG. 5, the push-on fixer 12 is connected to the aiming screw 14 (16) so as to prevent the screw from being removed, and the gear case 31 is secured onto the rear wall of the lamp body 10 by the screw 35.

The rotational operating shaft 32 extending upward from the gear unit 30 is provided at the upper end face thereof a concave engaging part 32a which is engageable with the tip end 51 of a driver 50. When the tip end 51 of the driver 50 comes into engagement with the concave engaging part 32a and the rotational operating shaft 32 is rotated by the driver 50, the aiming screw 14 (16) is also rotated, so that the reflector 20 is tilted along a horizontal axis $L_x$ or a vertical axis $L_y$. The optical axis of the headlamp is hence tilted and adjusted in vertical and horizontal directions.

As shown in FIGS. 2 and 5, the rear wall of the lamp body 10 is expanded like a visor for covering the protruding part of the gear unit 30, thus constituting an expanding member 40. The rotational operating shaft 32 is inclined rearward and aligned with a driver guide face 41 of the expanding member 40 located above a concave engaging part 32a of the rotational operating shaft. An upper edge 40a of the expanding member 40 and an upper end part of the rotational operating shaft 32, namely, the most rearward protruding portion of the gear unit 30, are located in substantially the same plane in the front-rear direction of the headlamp. That is, as shown in FIG. 5, the protruding distance $l_1$ of the expanding member 40 is substantially the same as the rearward protruding distance $l_2$ of the gear unit.

Accordingly, the orthogonal conversion gear mechanism is protected from damage while being handling. Specifically, when the headlamp is assembled to the automobile, for example, in the conventional arrangement the gear unit 30 could be struck against the automobile body and the gear unit broken or damaged. However, according to the present invention, since the gear unit 30 is disposed under and is covered by the expanding member 40, which is expanded over the gear unit like a visor, the gear unit 30 cannot be directly struck against the automobile body because the expanding member 40 would be struck rather than the gear unit. Therefore, the possibility of the orthogonal conversion gear mechanism being damaged or broken is greatly reduced.

The driver guide face 41 of the expanding member 40 functions as a driver guide for guiding the tip 51 of the driver 50 to the concave engaging part 32a of the rotational operation shaft 32. That is, when an actual aiming operation is carried out by inserting the driver S0 through a circular hole 72 formed in a vehicle side cover 70 covering the headlamp, the tip S1 of the driver 50 is readily guided by the driver guide face 41 of the expanding member 40 to the concave engaging part 32a of the rotational operating shaft 32.

Further, a pair of rising walls 42 are formed on the driver guide face 41 of the expanding member 40, which walls extend parallel to one another in the vertical direction. The rising walls 42 act as a driver side part member which is U-shaped in cross section, as best shown in FIG. 3. Since the pair of rising walls 42 serving as the driver side part guide member define the lateral position of the driver 50 when inserted, the driver 50 can be quickly and firmly engaged with the rotational operating shaft 32. Further, since the driver side part guide member, i.e., the rising walls 42, surround the left and right side surface as well as the front surface of the driver 50, cooperating with the front driver guide face 41 of the expanding member 40 so that the driver 50 is prevented from wobbling when the driver 50 rotated, the tip 51 of the driver 50 is prevented from being disengaged from the shaft 32. Therefore, smooth rotation of the rotational operating shaft is assured. Furthermore, since the driver side part guide member having a U-shaped cross section is wider at the opening edge rather than at the bottom thereof, the driver 50 easily comes into engagement with the guide member.

Reference numeral 41a designates ribs for reinforcing the thin rising walls 42.

An extension reflector 60 formed of synthetic resin is accommodated within a lamp chamber defined by the lamp body 10 and the front cover 11. The extension reflector 60 extends from the periphery of the reflector 20. The surface of the extension reflector 60 is subjected to an aluminum deposition treatment so as to hide the peripheral region of the reflector and to provide the overall lamp chamber with a metallic color to blend it with the reflector 20.

Steps having substantially the same shape, viewed from the front, as the steps formed on the multiple reflection surface 20a are formed on both the surface of the extension reflector 60 and the surface of the shade 23 for the dimmed light beam, thus to obtain design conformity of patterns among the reflector 20, shade 23 and extension reflector 60 when one views those parts through the front cover 11.

The extension reflector 60 is made wavy and convex to the front side in cross section, so that sunlight incident through the front cover 11 is reflected and diffused by the wavy convex surface of the extension reflector 60. Therefore, since the light reflected by one part of the extension reflector 60 is not directed to the other parts of the extension reflector, the extension reflector 60 formed of synthetic resin will not be deformed due to the heat of sunlight.

A disc-shaped cover 80 formed of rubber is fitted between the rear opening of the lamp body 10 and a rear end part of a metal base 22a of the bulb 22 to cover the rear opening of the lamp body 10. As shown in FIG. 4, a pair of lower and upper air holes 82 and 84 are formed in the rubber cover 80 for allowing air flow in and out of the headlamp. Specifically, ambient air enters the lamp body 10 through the lower air hole 82 while air heated in the lamp body 10 is discharged through the upper air hole 84. Accordingly, owing to the air circulated by convection in this manner, undesirable condensation of moisture is prevented.

Further, a packing 86 is provided at a position facing the entrance of the lower air hole 82 of the lamp body 10 for damping shock or vibration transmitted from the automobile body 85. The packing 86 also functions to prevent drops of water passing along the rear surface of the rear wall of the lamp body from reaching the lower air hole 82.

A vertical inclination detector 90, in the form of a bubble vial, is mounted on an upper wall of the reflector 20 for detecting the inclination angle of the headlamp in the vertical direction of the reflector 20, that is, the inclination angle in the vertical direction of the optical axis L of the headlamp. A viewing window 92 is disposed just above the inclination detector 90 for the lamp body 10, through which a scale of the inclination detector 90, i.e., a scale marked on the bubble vial, can be read.

As shown in FIG. 2, a horizontal inclination detector 96 is disposed between the rear wall of the lamp body 10 and the reflector 20 for detecting the inclination angle in the horizontal direction of the reflector 20, that is, the inclination angle in the horizontal direction of the optical axis L of the headlamp.

A viewing window 97 is disposed just above the inclination detector 96 for the lamp body 10, through which the scale of the inclination detector 96 can be read.

Figure 6:
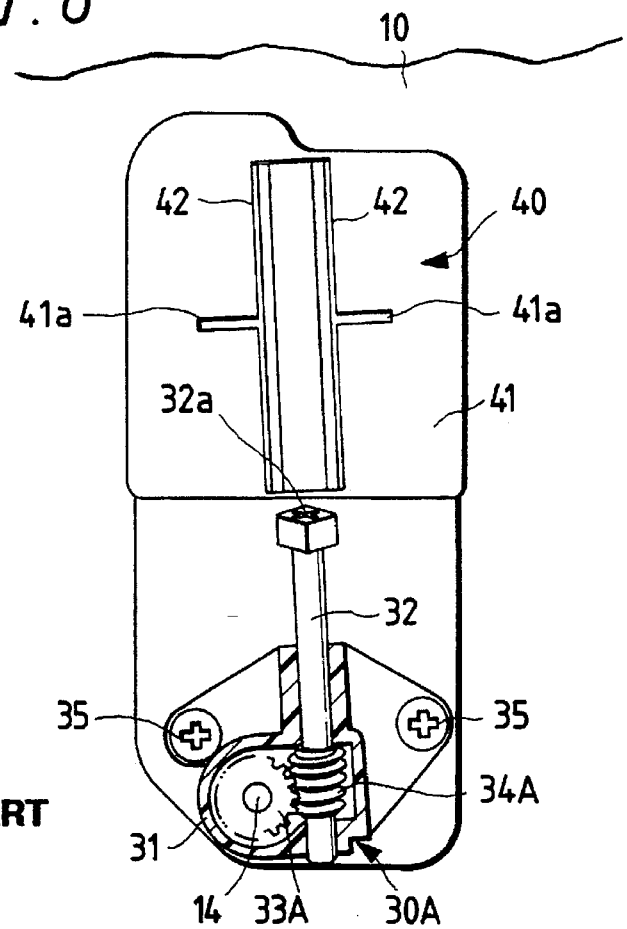
FIG. 6 is a rear view of the headlamp, with a gear unit shown in cross section, showing an essential part of another arrangement of an orthogonal conversion gear mechanism according to the present invention.
Figure 7:
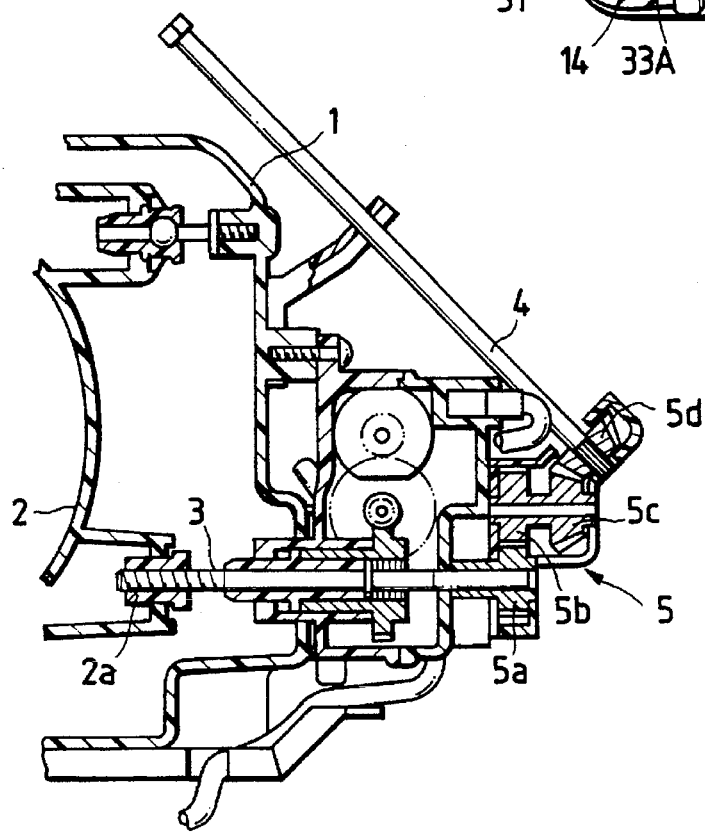
FIG. 7 is an illustration of a prior art headlamp.

FIG. 6 is a rear view of the headlamp, with a gear unit shown in cross section, showing an essential part of another arrangement of an orthogonal conversion gear mechanism according to the present invention.

In the aforementioned embodiment, the orthogonal conversion gear mechanism, i.e., gear unit 30, is constituted by the aiming screw 14 and a pair of bevel gears 33 and 34 engaging with the rotational operating shaft 32. The present arrangement shown in FIG. 6, however, is provided with a gear unit 30A as an orthogonal conversion gear mechanism which is constituted by a worm wheel 33A and a worm 34A integrally formed with a lower end part of the rotational operating shaft 32. The remaining structure, that is, the structure other than the gear unit 30A of the present arrangement, is the same as in the foregoing embodiment, and, accordingly, a further description thereof is omitted, noting that like elements are indicated by the same reference numerals.

As described above, the headlamp for an automobile according to the present invention is provided with an expanding member protruding from the rear wall of the lamp body for covering the orthogonal conversion gear mechanism like a visor. Therefore, the orthogonal conversion gear mechanism is protected from being struck when the headlamp is assembled on the vehicle body, and thus the possibility of damaging or breaking the orthogonal conversion gear mechanism, i.e., the aiming mechanism, is effectively reduced.

Further, since the tip of the driver is guided by the driver guide face of the expanding member to the concave engaging part of the rotational operating shaft, speedy operation of the shaft by the driver is assured.

Furthermore, according to another aspect of the present invention, since both the rotational operating shaft and the driver guide face of the expanding member, which are aligned with each other, are inclined rearward, the rear end part of the driver guide face is located rearward of the position of the concave engaging part of the rotational operating shaft disposed on the upper end face thereof. Accordingly, the possibility of striking the orthogonal conversion gear mechanism is further lowered.

Moreover, according to still another aspect of the present invention, since the driver side part guide member guides the driver used for operating the rotational operating shaft, accurate, smooth and appropriate rotation of the shaft by the driver are assured.

What is claimed is:

1. A vehicular headlamp, comprising:

a lamp body having a rear wall;

a reflector accommodated in said lamp body;

an aiming mechanism tiltably supporting said reflector with respect to said lamp body, said aiming mechanism comprising:

an upper ball joint support tiltably supporting said reflector to said rear wall of said body;

an aiming screw extending in a front-rear direction of said lamp body, a rear end part of said aiming screw penetrating a rear wall of said lamp body and protruding rearward from said lamp body;

an orthogonal conversion gear mechanism engaging a rear end part of said aiming screw; and a rotational operating shaft having first and second ends and being linked at said first end with said aiming screw via said gear mechanism for operating the same to rotate, said rotational operating shaft being provided at said second end thereof with an engaging part engageable with an end of a driver; and an expanding member comprising a protruding portion of said rear wall of said lamp body, disposed below and extending rearward of said upper ball joint support for protectively covering said orthogonal conversion gear mechanism of said aiming mechanism.

2. The vehicular headlamp according to claim 1, further comprising a gear case housing said orthogonal conversion gear mechanism.

3. The vehicular headlamp according to claim 1, wherein said orthogonal conversion gear mechanism comprises a pair of bevel gears.

4. The vehicular headlamp according to claim 1, wherein said orthogonal conversion gear mechanism comprises a worm wheel and a worm integrally formed with a lower end part of said rotational operating shaft.

5. The vehicular headlamp according to claim 1, wherein said expanding member covers a protruding part of said orthogonal conversion gear mechanism.

6. The vehicular headlamp according to claim 5, wherein an upper edge of said expanding member and an upper end part of said rotational operating shaft are located in substantially the same plane in the front-rear direction of the headlamp.

7. The vehicular headlamp according to claim 6, wherein a protruding distance of said expanding member is substantially the same as a rearward protruding distance of said orthogonal conversion gear mechanism.

8. A vehicular reflector, comprising:

a lamp body;

a reflector accommodated in said lamp body;

an aiming mechanism tiltably supporting said reflector with respect to said lamp body, said aiming mechanism comprising:

an aiming screw extending in a front-rear direction of said lamp body, a rear end part of said aiming screw penetrating a rear wall of said lamp body and protruding rearward from said lamp body;

an orthogonal conversion gear mechanism engaging a rear end part of said aiming screw; and a rotational operating shaft having first and second ends and being linked at said first end with said aiming screw via said gear mechanism for operating the same to rotate, said rotational operating shaft being provided at said second end thereof with an engaging part engageable with an end of a driver; and an expanding member protruding from a rear wall of said lamp body covering said orthogonal conversion gear mechanism of said aiming mechanism wherein said expanding member comprises a driver guide face disposed at an upper portion of said rotational operating shaft of said aiming mechanism, both said driver guide face and said rotational operating shaft being inclined rearward to align with one another.

9. The vehicular headlamp according to either claim 8, wherein said expanding member comprises a driver side part guide member surrounding a side part of said driver.

10. The vehicular headlamp according to claim 9, wherein said driver side part guide member of said expanding member comprises a pair of rising walls.

11. The vehicular headlamp according to claim 10, wherein said driver side part guide member of said expanding member comprises a pair of ribs for reinforcing said rising walls.

12. A vehicular headlamp, comprising:

a lamp body having a rear wall;

a reflector accommodated in said lamp body;

an aiming mechanism tiltably supporting said reflector with respect to said lamp body, said aiming mechanism comprising:

an aiming screw extending in a front-rear direction of said lamp body, a rear end part of said aiming screw penetrating a rear wall of said lamp body and protruding rearward from said lamp body;

an orthogonal conversion gear mechanism engaging a rear end part of said aiming screw; and a rotational operating shaft having first and second ends and being linked at said first end with said aiming screw via said gear mechanism for operating the same to rotate, said rotational operating shaft being provided at said second end thereof with an engaging part engageable with an end of a driver; and an expanding member comprising a protruding portion of said rear wall of said lamp body, for protectively covering said orthogonal conversion gear mechanism of said aiming mechanism, wherein said expanding member comprises a driver side part guide member surrounding a side part of said driver.

13. The vehicular headlamp according to claim 12, wherein said driver side part guide member of said expanding member comprises a pair of rising walls.

14. The vehicular headlamp according claim 13, wherein said driver side part guide member of said expanding member comprises a pair of ribs for reinforcing said rising walls.

* * * * *